July 12, 1949.  M. N. YARDENY  2,476,016
ONE-WAY STOPPING MEANS FOR CONTROL APPARATUS
Filed Feb. 12, 1944
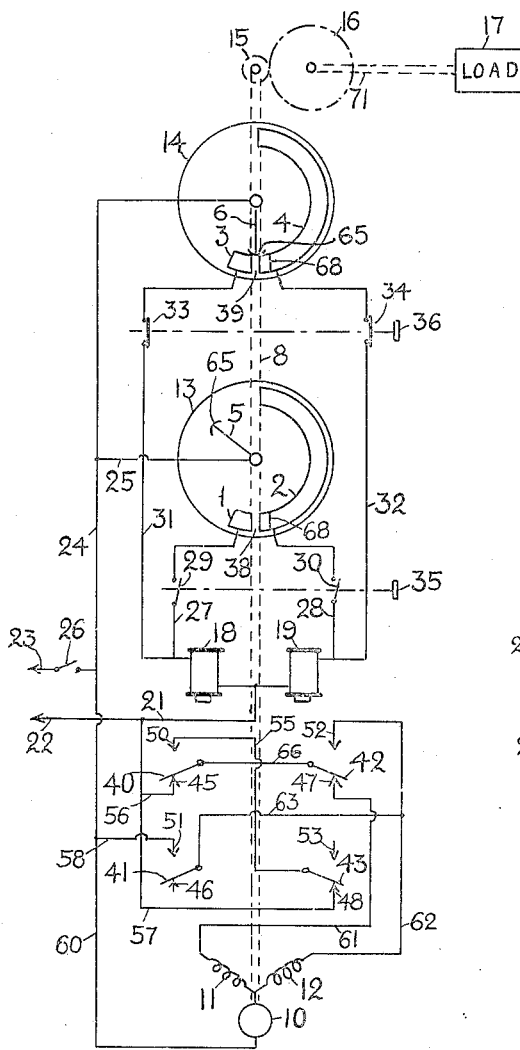
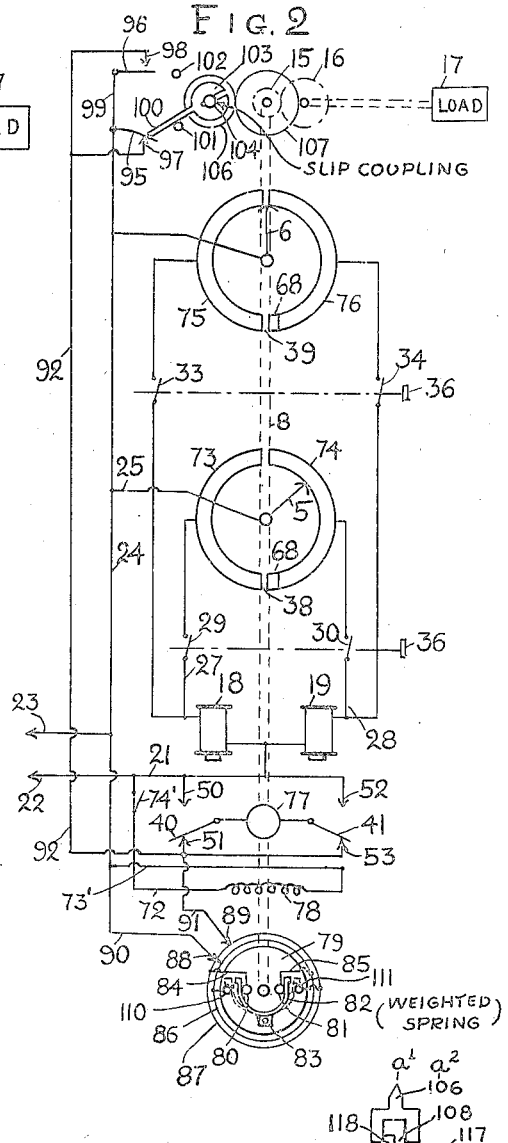
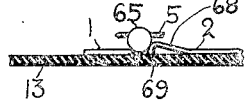
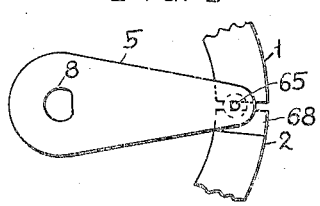
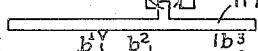
MICHEL N. YARDENY
INVENTOR
BY John P. Wilson
ATTORNEY Patented July 12, 1949

2,476,016

UNITED STATES PATENT OFFICE 2,476,016

ONE-WAY STOPPING MEANS FOR CONTROL APPARATUS

Michel N. Yardeny, New York, N. Y.

Application February 12, 1944, Serial No. 522,062

2 Claims. (Cl. 318—33)

My invention relates to control apparatus and has particular reference to apparatus and systems in which a motor or other movable means is electrically controlled for placing the same in one of several predetermined positions.

My invention has further reference to control devices comprising a plurality of sets or pairs of control elements, each set or pair of control elements being adjusted or preselected for placing an electric motor in an exact predetermined position. The control elements are provided for this purpose with a certain neutral point, usually in the form of a gap between conducting members, a contactor or contact member being movable and adapted to engage the conducting members thereby controlling the direction of rotation of the motor, depending on the position of the contact member at one or the other side of the neutral point, the motor being stopped when the contact member reaches the neutral point. I have found that great accuracy may be obtained with my apparatus if the same is constructed in accordance with my Patent No. 2,342,717 of February 29, 1944, also with the teachings of my patent applications Serial No. 513,731, filed December 10, 1943, and Serial No. 516,680, filed January 1, 1944, particularly in accordance with the arrangements for accurately stopping the motor and for preventing its hunting when the neutral point is occupied.

In control apparatus of the foregoing type, a more or less noticeable difference in the position of the motor may occur, depending on the direction of rotation at the moment of the stopping of the motor. This difference or error is caused by a certain backlash or play between the moving parts, particularly between the control elements.

I have found that the accuracy of an apparatus of the type described can be considerably increased by always stopping the motor when moving in a predetermined direction, thereby eliminating the effect of play or backlash. This can be accomplished by using, for example, the frictional yieldable or overrunning clutch as disclosed in my previously mentioned patent and pending patent applications, also in my patent applications Serial No. 477,469, filed February 27, 1943, and Serial No. 490,767, filed June 14, 1943, now abandoned, which allows the motor or drive means operated by the motor or a similar agency to make limited additional movements before coming to a final stop, always in the same direction.

An object of my invention is to increase the accuracy of an apparatus of the type described by causing the motor to stop after a final movement in one particular direction; this can be accomplished either by electrical means, as described in my foregoing application No. 513,731, or by constructing the control elements in my apparatus so that the contact member is yieldably retained in the gap while the motor is deenergized and that inertia of the motor is absorbed by the frictional clutch, the retaining action being effective only for a definite direction of movement. One of the conducting members is raised for this purpose at or near the gap, forming an obstruction for the conducting member sufficient to detain the motor after it is deenergized and its energy of inertia largely absorbed by the overrunning clutch.

The motor tends to overrun by inertia when the gap is reached for the first time, causing the contact member to pass over the gap to the other conducting member, thereby reversing the rotation of the motor and rendering the frictional clutch operative. The motor then stops when the gap is again reached. The stopping of the motor can be made more positive by providing an arrangement to retard the motor rotation after it is reversed, and the accuracy of the stopping in the exact required position is greatly increased by stopping always in the same direction.

According to my invention I provide a detent at one side of the gap causing the contact member to stop the motor always in the same direction of its rotation. The contact member easily overruns the gap when moving over the smooth end, but is detained when moving against the raised end. The motor, therefore, after very fast oscillations will always stop when the contact member moves against the raised end of the conducting member and is caught or arrested in the gap.

Another object of my invention is to increase further the accuracy of an apparatus of the type described by eliminating the effect of play between the control elements and the useful load, especially if a geared or similar transmission is employed. This object is attained by providing resilient means at the useful load for maintaining a certain unidirectional torque applied to the load. These means, in conjunction with the arrangement for stopping the load always in the same direction, practically eliminate the effect of any lost motion or play in the transmission.

My invention is more fully described in the accompanying specification and drawing in which—

Fig. 1 is a diagrammatic view of a circuit diagram of an apparatus or system according to my invention in which the motor is always stopped when moving in the same direction and also of means for reducing the motor speed at the gap, and for providing an added unidirectional torque to the useful load.

Fig. 2 is a modified system of a motor control employing another arrangement for reducing the motor speed at the gap.

Figs. 3 and 4 are detail views of control elements at the gap, showing one conducting member raised or elevated for retaining the contact member at the gap.

Fig. 5 is a schematic illustration showing the theory underlying the invention of this application.

My control apparatus or system shown in Fig. 1 comprises a plurality of control units, each unit including two elements; a pair of conducting segments 1, 2 and 3, 4 separated by gaps 38 and 39 respectively and contact arms 5, 6 having a contact point 65 slidably engaging the respective pair of the conducting segments. The segments are mounted on insulation discs 13, 14. The arms are mounted on a common shaft 8 connected by a frictional overrunning clutch 9 with an electric motor having an armature 10 and reversing windings 11, 12 connected in series with the armature. The shaft 8 is connected through gears, 15, 16 with a useful load 17.

The control elements control the motor through the medium of reversing relays having coils 18, 19. The coils are connected at one side by a lead 21 to the terminal 22 of a source of current, the other terminal 23 of the source of current being connected by leads 24, 25 and a switch 26 to the contact arms 5, 6 respectively. The other ends of the coils 18, 19 are connected by leads 27, 28 and switches 29, 30 to the segments 1, 2 and by leads 31, 32 and switches 33, 34 to the segments 3, 4. The two pairs of switches are operated by respective common handles 35, 36. When one pair of the switches and switch 26 are closed, the coils 18, 19 will be energized according to the position of the corresponding arm 5 or 6. If one of the arms engages one of the segments, the corresponding coil will be energized. Both coils will be simultaneously energized when an arm bridges the gap 38 or 39 between the respective segments.

Each coil controls two contact arms 40, 41, and 42, 43 respectively. The arms rest on points 45, 46, 47 and 48 when the relay coils are deenergized, as for instance, when the switch 26 is opened. The arms, when attracted by the energized coils 18, 19, engage points 50, 51, 52 and 53. The points are connected as follows: point 50 is connected by a lead 55 to the arm 43; point 45 is connected by a lead 56 to a lead 57 connected at one end to the lead 21 and at the other end to the point 48; point 51 is connected by a lead 58 to a lead 60 connected at one end to the terminal 23 and at the other end to one terminal of the armature 10, the other terminal of the armature being connected to the windings 11, 12; these windings are connected by leads 61, 62 with the points 47, 52 respectively, the lead 62 being also connected by a lead 63 to the arm 41. Arms 40, 42 are connected by a lead 66. Point 46 is a blind point.

The operation of the system shown in Fig. 1 is as follows:

Assuming that switches 26, 29 and 30 are closed and that the arm 5 rests with its contact point 65 on the insulation disc 13 as shown then both relay coils will be deenergized, leaving the contact arms in their released positions as shown. Suitable retrieving springs may be provided for the relay arms (not shown on the drawing for the sake of clearness). The motor will be then energized, current passing from the terminal 22 through the leads 21, 57, 56, point 45, arm 40, connecting lead 66, arm 42, point 47, lead 61, motor winding 11, armature 10 and lead 60 to the terminal 23. The motor will rotate in a direction for causing the arm 5 to move toward segment 1 and gap 38, i. e. in a counterclockwise direction as shown on the drawing. It should be noted that in all such systems the connections are always so made that the contact arm moves in this direction toward the gap 38 or 39.

In the arrangement shown in Fig. 1 the conducting members 1 and 3 respectively which are engaged by the arms before reaching a gap are relatively short, their object being solely to reduce the speed of the motor when the contact arm approaches the gap in one direction, thereby facilitating stopping of the motor when the gap is bridged by the point 65 of a contact arm, and increasing the accuracy because the motor stops only after moving in one particular direction.

As soon as the conducting segment 1 is reached by the arm 5, the corresponding relay coil 18 will be energized, attracting the relay arms 40 and 41. As a result, current will flow from the terminal 22 through the leads 21, 57, point 48, arm 43, lead 55, point 52, arm 40, lead 66, arm 42, point 47, lead 61, winding 11, armature 10 and lead 60 to the terminal 23. The motor therefore will continue in the same direction, moving the arm 5 toward the gap 38. Current, however, will also flow from the winding 11 through the winding 12, leads 62, 63, arm 41, point 51, and leads 58, 60 to the terminal 23. The winding 12 is connected for the same polarity as the winding 11, thus considerably strengthening the magnetic field of the motor and, consequently, slowing down the motor rotation, when the contact arm moves toward the gap in this particular direction. If the gap 38 is crossed by the arm 5 due to the force of inertia, the motor rotation will be reversed, the coil 19 being now energized and the arms 42, 43 attracted while the coil 18 is deenergized, releasing the arms 40 and 41. As a result, current will flow from the terminal 22 through the leads 21, 57, 56, point 45, arm 40, lead 66, arm 42, point 52, lead 62, winding 12, armature 10 and leads 60 to the terminal 23. The motor rotation will be therefore reversed, returning the contact arm 5 to the gap at full speed, and will be stopped after return movement at reduced speed.

The schematic showing of Fig. 5 will explain the manner in which the improved device of this invention is effective to move the load precisely to a desired end position irrespective of any lost motion, loose play, backlash, torsional rotational distortion, etc. between the contact arm 5, 6, or rather the point of the load shaft 8 at which the contact arms are secured, and the load represented symbolically at 17 in the figures. As explained above, this is achieved by causing the motor rotation to be stopped at all times when the contact arm 5, 6, reaches gap or neutral point 38, 39, in rotating counterclockwise. As also explained above, instrumentalities are provided fully described above, which cause motor rotation to be stopped in this manner even when the normal rotation of the contact arms, 5, 6, is in a clockise direction; this, as already explained, is achieved by causing a reversal of rotation after the contact arm passes the gap or neutral point.

As pointed out in the preceding paragraph, the improvement is designed to overcome backlash etc., between the contact arm, for example 6 and the load 17. Accordingly, the counter parts of these two points in the system schematically shown in Fig. 5 are designated 117 (to represent the load 17) and 106 (representing contact arm 6). The schematic arm or shaft member 106 which drives the schematic load member 117, is shown bifurcated to provide schematically a relatively large opening 108 between its two side flanges—this, it will be understood schematically represents the extent of backlash, play, etc. between contact arm 6, or rather its point of securement to shaft 8, and the load 17. Disposed within the said schematic backlash opening 108 is a lug 118 projecting from the schematic load member 117.

A glance at Fig. 1 will reveal that when the contact arm 6 is moving counterclockwise, its contact element 65 moves from left to right. To make the schematic showing more representative of the actual physical arrangement of Fig. 1, member 106 moves from left to right when the contact arm is turning counterclockwise; on the other hand, when the contact arm is moving clockwise, the member 106 will be moved from right to left. Let us take, as the first example, rotation of contact arm 6 in a counter-clockwise direction which means that member 106 is moving from left to right from a first position designated $a^1$ to a second position $a^2$. Inasmuch as explained above, projection 118 of load 117 is constantly kept in abutment with the lefthand leg of the drive member 106, the left to right movement of 106 will cause the load member 117 to move from a first point $b^1$ to second point $b^2$, the distance between $b^1$ and $b^2$ being taken to be precisely the same as the distance between $a^1$ and $a^2$. This movement of the drive member 106 from $a^1$ to $a^2$, causing the load member 117 to move from position $b^1$ precisely to position $b^2$, schematically illustrates the precise position of the load 17 at a time when the contact arm 6 is moving counterclockwise and reaches gap 39 to stop motor rotation.

It will be noted that in the first example of a counterclockwise turning of the contact arm (a left to right movement of schematic members 106 and 117) there is required no reversal in motor direction because the contact arm 6 does approach gap 39 turning counterclockwise. However, a reversal is required when the contact arm 6 is turning in clockwise direction; this is schematically shown in Fig. 5 as follows: we will assume that the load member 117 is to be moved from right to left from a point $b^3$ to a point $b^2$ (corresponding as explained above, to a clockwise movement of contact arm 6 or the load 17). This right to left movement is indicated by the short arrow designated A in Fig. 5 starting at point $b^3$ but falling short of point $b^2$ by a distance equal to the amount of clearance—schematically representing backlash and play—between projection 118 and recess 108 of the drive member 106.

Considering now the operation of the schematic parts shown in Fig. 5 as applied for carrying out the principles of the invention, we will again assume a similar right to left movement indicated in Fig. 5 by the line designated B and starting, as in the case of line A, at point $b^3$. As fully explained in the description of the apparatus of Figs. 1 and 2, when the normal motor rotation is clockwise (right to left in schematic Fig. 5) the contact arm 6 continues a short distance beyond the gap 39 to cause a reversal in motor rotation; the overrunning of the contact arm beyond the gap is schematically represented in Fig. 5 by the prolongation of line B, and the reversal in direction of motor rotation from clockwise to counterclockwise (from right to left in Fig. 5, to left to right) by the reverted arrow designated $B^1$. Also, as fully described in connection with Figs. 1 to 4 of the drawing, after the aforesaid reversal, contact arm 6 comes to a precise stop at the gap. This is represented by the termination of the short arrow precisely at point $B^2$ in Fig. 5.

While the backlash and play, schematically represented by the difference between the clearance 108 and the width of the projection 118, would make the right to left movement erratic, as has been seen to be the case represented by arrow A, this is of no consequence by reason of the fact that after the reversal, at $B^1$, the schematic load member 117 is brought precisely to the desired stopping position at $B^2$ by the direct abutment of the left leg of the bifurcated driving member 106 with the projection 118.

In addition to this purely electrical means for causing the motor always to stop after movement in a certain direction, a mechanical means can be employed for the same purpose, comprising a raised portion 68 at the end of the segment 2 with a steep shoulder 69 at the gap. Crossing of the gap in direction from the segment 2 will be relatively uninhibited, the resilient arm 5 easily passing over the low rise 68 at the end of the segment 2 and over the flat end of the short segment 1 (see Figs. 3 and 4). On the return movement of the contact arm 5, however, the point 65 will meet the relatively high and steep end 69 of the segment 2 and will abut against it, preventing further movement of the motor whose movement has already been substantially retarded by the arrangement of the two windings 11, 12 being connected in parallel and by absorption of the motor inertia to a substantial extent by the action of the frictional overrunning clutch 9.

The motor, therefore, will be stopped after a single reversal of rotation when moving over the segment 2 and will be stopped after the second reversal when the arm 5 moves from the segment 1. In either case the motor will be stopped moving in the same direction. The motor will be de-energized when the gap 38 is bridged by the point 65, causing both relay coils to be energized.

A modified system is shown in Fig. 2, the segments 73, 74, 75, 76 having all the same size. One of the relay coils 18, 19 will therefore be energized when a pair of switches 29, 30 or 33, 34 is closed. The drive means used comprise a shunt wound motor having an armature 77, whose terminals are connected with the arms 40, 41, the shunt winding 78 being connected by leads 72, 73 and switch 74 with the terminals 22, 23. Instead of a shunt winding a permanent magnet may be used.

A rotary interrupter for the armature current is provided with a switch for rendering the interrupter operative for a short time after each reversal of rotation of the motor. The rotary interrupter comprises an insulation disc 79 mounted on the shaft 8 and provided with contact posts 80, 81 engaged by a spring 82 fastened at its middle point to a block 83 attached to the disc 79. The posts 80, 81 are connected by leads 84, 85 to collector rings 86, 87, engaged by brushes 88, 89. The brush 88 is connected to the terminal 23 by a lead 90 and the brush 89 is connected to point 51 and lead 92 by lead 91. During normal motor rotation, the rotary switch is short circuited and rendered inoperative by a special switch comprising resilient contact arms 95, 96 and points 97, 98, the arms being connected to the terminal 23 by leads 99, 24, and the points 97, 98 being connected to the lead 92. The arms 95, 96 are operated by a finger 100 moving between stops 101, 102 and extending from a split bushing 103, frictionally mounted on a shaft 104 carrying a friction wheel 106. The latter is engaged by a wheel 107 on the main shaft 3. The switch points are therefore closed during rotation of the motor in either direction and are opened only for a short period during reversal of the rotation, when the finger 100 moves from one stop to the other. During this time current for the armature 77 passes through the rotary switch. This switch will open the motor circuit whenever the speed rises above a certain low limit by the action of spring 82 moving away from contacts 80, 81 due to the centrifugal force, as shown in dotted lines, thus maintaining the current continuously pulsating and causing the armature to rotate at a low pulsating speed, thereby causing the motor to stop when the gap is reached by the contact arm.

The motor will be positively stopped when after one or two reversals the contact point 65 is stopped by the high edge 69 of segment 74 or 76.

To facilitate reversal of the motor when contact member 5 or 6 crosses the gap at high speed due to inertia, additional contact posts 110, 111 may be provided at the periphery of disc 79. These posts are connected to collector rings 86, 87 and are engaged by spring 82 at high motor speed only, thereby permitting an immediate energizing of the reversing windings after the gap is crossed by a contact arm. The motor speed is sufficiently reduced after reversal to permit the spring to move away from outer posts 110, 111, thereby breaking the motor circuit thus causing the motor to run at low speed. Rotary interrupters of this type are described in my previously mentioned copending application Ser. No. 516,680, filed January 1, 1944.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. In remote control apparatus for moving a load to desired position, in combination, a reversible motor, a pair of relatively movable members, one of the members having conducting elements separated by a gap and the other member being a contact arm engageable with the conducting elements to rotate the motor in the desired direction, one of the said pair of members being moved by the said motor into alignment with the said gap to stop motor rotation, and means associated with the said pair of relatively movable members for causing the said stoppage of motor rotation to occur when the said member is moving in a predetermined direction toward the gap during normal motor rotation in the said predetermined direction and for preliminarily causing, when the motor rotates in the other direction, overrunning beyond the gap and reversal in motor rotation to result in movement of the said member in the said predetermined direction, the said stopping of the motor in a predetermined direction causing the load to be brought to a stopping position coming from a predetermined direction, said means including a detent disposed at the side of the said gap anteriorly of the said predetermined direction effective to positively stop the said contact arm when moving in the said predetermined direction at the said gap and to enable said contact arm moving in the opposite direction to override the detent.

2. In remote control apparatus for moving a load to desired position, in combination, a reversible motor, a pair of relatively movable members, one of the members having conducting elements separated by a gap and the other member being a contact arm engageable with the conducting elements to rotate the motor in the desired direction, one of the said pair of members being moved by the said motor into alignment with the said gap to stop motor rotation, and means associated with the said pair of relatively movable members for causing the said stoppage of motor rotation to occur when the said member is moving in a predetermined direction toward the gap during normal motor rotation in the said predetermined direction and for preliminarily causing, when the motor rotates in the other direction, overrunning beyond the gap and reversal in motor rotation to result in movement of the said member in the said predetermined direction, the said stopping of the motor in a predetermined direction causing the load to be brought to a stopping position coming from a predetermined direction, said means comprising a detent disposed at the side of the said gap anteriorly of the said predetermined direction, said detent comprising the terminal portion of the said conducting element adjacent the gap formed to present a short leg to the said gap and a gradually sloped portion between the said leg and the said conducting element.

MICHEL N. YARDENY.

REFERENCES CITED

The following references are of record in the file of this patent:

UNITED STATES PATENTS

| Number | Name | Date |
|---|---|---|
| 1,822,700 | Hunter | Sept. 8, 1931 |
| 1,853,506 | Carter | April 12, 1932 |
| 2,342,717 | Yardeny | Feb. 29, 1944 |